(12) United States Patent
Lee et al.

(10) Patent No.: US 8,799,337 B2
(45) Date of Patent: Aug. 5, 2014

(54) SYSTEM RESET AND SYSTEM RESTORE

(75) Inventors: Desmond T. Lee, Redmond, WA (US);
Vinit Ogale, Bellevue, WA (US);
Keshava Prasad Subramanya,
Bellevue, WA (US); **Sri Sai Kameswara
Pavan Kumar Kasturi**, Redmond, WA
(US); Hongliu Zheng, Sammamish, WA
(US); Yunan Yuan, Redmond, WA (US);
Gregory W. Nichols, Bellevue, WA
(US); Stephan Doll, Seattle, WA (US);
Kiran Kumar Dowluru, Redmond, WA
(US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 12/969,107

(22) Filed: Dec. 15, 2010

(65) Prior Publication Data
US 2012/0158665 A1 Jun. 21, 2012

(51) Int. Cl.
*G06F 17/30* (2006.01)
(52) U.S. Cl.
USPC ........... 707/831; 707/640; 707/644; 707/647; 707/651
(58) Field of Classification Search
USPC .......................... 707/831, 640, 644, 647, 651
See application file for complete search history.

(56) References Cited

U.S. PATENT DOCUMENTS

| | | | |
|---|---|---|---|
| 2005/0278360 A1 | 12/2005 | Boyd et al. | |
| 2006/0085784 A1* | 4/2006 | Traut et al. | 718/1 |
| 2010/0049750 A1 | 2/2010 | Srivastava | |
| 2010/0070725 A1* | 3/2010 | Prahlad et al. | 711/162 |

OTHER PUBLICATIONS

Whoops . . . Glad at Created a Checkpoint—Published Date: Dec. 5, 2007; http://blogs.technet.com/b/rakeshm/archive/2007/12/05/checkpoints.aspx.
Azure Server Virtualization Provisioning and Multitenancy—Published Date: Apr. 19, 2009; http://azure.snagy.name/blog/?p=93.
Disk Use in a NxTop (2.0)—Retrieved Date: Sep. 27, 2010; http://www.virtualcomputer.com/support/tutorials-disk-use-in-nxtop2.

(Continued)

*Primary Examiner* — Sana Al Hashemi
(74) *Attorney, Agent, or Firm* — John Jardine; Andrew Sanders; Micky Minhas

(57) ABSTRACT

Some embodiments of the invention provide techniques for performing system reset and/or system restore operations. Some embodiments store a record of any changes performed to a data file stored on a virtual hard disk using differencing virtual disks that are captured over time. To restore the file to the state in which it existed at any particular point in time, embodiments of the invention may allow for rolling back the system to a differencing virtual disk captured at or before that time and setting aside blocks of the differencing virtual disk chain captured after that point. To perform a system reset, the system may be rolled back to the parent virtual hard disk, by setting aside all of the blocks of the differencing virtual disk chain. Some embodiments of the invention provide for separating information on the system into a plurality of entities, and maintaining a separate set of differencing virtual disks for each entity. For example, some embodiments may create an entity may be created for each of the operating system, applications and user data, and maintain differencing virtual disks for each over time.

13 Claims, 6 Drawing Sheets

(56) References Cited

OTHER PUBLICATIONS

Smart Memory Allocation—Retrieved Date: Sep. 27, 2010; http://www.virtualcomputer.com/support/tutorials-smart-allocation.

Virtual storage—Retrieved Date: Sep. 27, 2010; http://webcache.googleusercontent.com/search?q=cache:STGuU3L3r8kJ:www.virtualbox.org/manual/ch05.html+differencing+disk+chain+restore+restarting&cd=4&hl=en&ct=clnk &gl=in.

Best Practices for MS Virtual Server—Retrieved Date: Sep. 27, 2010; http://download.paragon-software.com/doc/Best_Practices_MS_Virtual_Server.pdf.

Moving from Virtual Server to Virtual Machine Manager—Retrieved Date: Sep. 27, 2010; http://technet.microsoft.com/en-us/library/bb963754.aspx.

\* cited by examiner

SYSTEM RESET AND SYSTEM RESTORE

FIELD OF THE INVENTION

This application relates to computer software, and more particularly to computer software used to restore or reset a computer.

BACKGROUND

Some conventional operating systems provide users the capability to "roll back" or "restore" the operating system and/or applications executing on a computer to a state in which those components existed at a previous point in time. For example, "system restore" capability may allow a user to roll back system files, registry keys, installed applications, and/or other components to a state in which the components existed prior to a system malfunction or failure. Similarly, some operating systems provide the capability to perform a "system reset," whereby the operating system and/or applications are reset to their original, "factory" settings. Typically, a system reset involves performing a system restore to take the system back to the state in which it originally existed, prior to any changes being made to the operating system and/or applications. (The terms "system restore" and "system reset" are used herein to reference these capabilities for convenience, although any similarity between either of these terms and a term used to describe a capability provided by any conventional operating system should not be read to limit the term to the functionality provided by that operating system.)

SUMMARY

Applicant has appreciated a number of deficiencies with conventional approaches to performing a system reset. For example, performing a system reset using conventional approaches is unnecessarily time-consuming. In this respect, performing a system reset using conventional approaches may take anywhere from twenty minutes to several hours. In addition, conventional approaches offer no guarantee that a user's data will be unaffected when a system reset is performed, since conventional systems do not enforce a clear "dividing line" between system data (e.g., that which comprises the operating system and/or applications) and the user's data. Further, conventional approaches do not offer a capability whereby a system reset can be "undone" after it is performed.

Applicant has also appreciated that at least some of these deficiencies result from the manner in which conventional systems store and manage data and applications. In this respect, conventional approaches to performing a system reset usually attempt to leave user data untouched. However, given the lack of a clear dividing line between system data and user data, performing a system reset often results in user data being inadvertently deleted. Because conventional systems offer no capability to "undo" a system reset, the user typically has no recourse and is unable to retrieve any data that is lost as a result of performing a system reset. With respect to applications, while some systems may store a copy of an old version of an application when it is replaced by a newer version (e.g., by moving the old version to a designated archive location), others do not, so that resetting the system to a point prior to that at which the application was updated may cause the application to be lost.

Some embodiments of the invention remedy these and other deficiencies associated with conventional approaches to performing a system reset by modifying the manner in which data and applications are stored and managed. For example, some embodiments of the invention store a record of any changes performed to a data file in one or more other files captured over time. For example, some embodiments of the invention may employ differencing virtual disks to isolate and store changes made to data on a virtual hard disk. (The term "virtual hard disk" is used herein to reference any software construct used to represent a hard disk or portion thereof, whether now known or later developed.) For example, a differencing virtual disk may represent a "snapshot" that captures all changes made to data on a "parent" virtual hard disk since a last differencing virtual disk was stored. At a predetermined periodicity (e.g., weekly, and/or at some other interval) and/or upon the occurrence of one or more predetermined events, a new differencing virtual disk may be started, so that a chain may be created over time that captures the changes that were made to the parent virtual hard disk. When a file is accessed by a user, the system may present a composite of the original file and any changes stored in differencing virtual disks captured over time. To restore the file to the state in which it existed at any particular point in time, the system may be rolled back to a particular differencing virtual disk. To perform a system reset, the system may be rolled back to the parent virtual hard disk.

Some embodiments of the invention may provide for separating information stored on the hard drive into a plurality of entities, and maintaining a separate set of differencing virtual disks for each entity. For example, some embodiments may separate the information stored on the hard disk into operating system, application and user data entities. As changes are made to the information that is stored in each entity over time, these changes may be captured in a chain of differencing virtual disks maintained for the entity. As a result, any individual entity may be restored to a particular point in time by reverting to a differencing virtual disk stored at or prior to that point. Alternatively, the entity may be reset by reverting to the parent virtual hard disk for the entity. Maintaining separate entities may enforce a clear dividing line between user data and non-user data on the system, and thus reduce the risk that user data is inadvertently lost when a system reset is performed. In addition, maintaining independent entities may allow the user to selectively reset or restore one or more entities, while leaving one or more others intact in their current state. For example, a user may reset the operating system to its factory condition, while leaving applications and user data intact, each in its current state.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some embodiments of the invention provide techniques for performing system reset or system restore operations. These techniques may, for example, be enabled via modifications to the manner in which conventional systems store and manage data and applications. For example, some embodiments store a record of any changes performed to a data file stored on a virtual hard disk using differencing virtual disks that are captured over time. For example, a differencing virtual disk may represent a snapshot of changes made to data on the parent virtual hard disk since a last differencing virtual disk was stored. A new differencing virtual disk may be started, for example, at a predetermined periodicity, upon the occurrence of one or more predetermined events, and/or using any of numerous other approaches. When a file is accessed by a user, the system may present a composite of the original file stored on the parent virtual hard disk and any changes represented in a chain of differencing virtual disks captured over time. To restore the file to the state in which it existed at any particular point in time, embodiments of the invention may allow for rolling back the system to a differencing virtual disk captured at or before that time, by setting aside blocks of the differencing virtual disk chain captured after that point. Similarly, to perform a system reset, embodiments of the invention may allow for rolling back the system to the parent virtual hard disk, by setting aside all of the blocks of the differencing virtual disk chain. Further, some embodiments of the invention provide for preserving blocks of a differencing virtual disk chain that were previously set aside, so that a system restore or system reset can be fully or partially undone by reattaching some or all of the blocks.

Further, some embodiments of the invention provide for separating the information that is stored into a plurality of entities. A separate set of differencing virtual disks may be maintained for each entity. For example, in some embodiments, an entity may be created for each of the operating system, applications and user data, and differencing virtual disks may be captured for each over time. By maintaining separate entities, embodiments of the invention may reduce the risk of inadvertently deleting user data when a system reset is performed. In addition, maintaining separate entities may allow the user to selectively reset or restore one or more entities while leaving one or more others in their current form.

Figure 1:
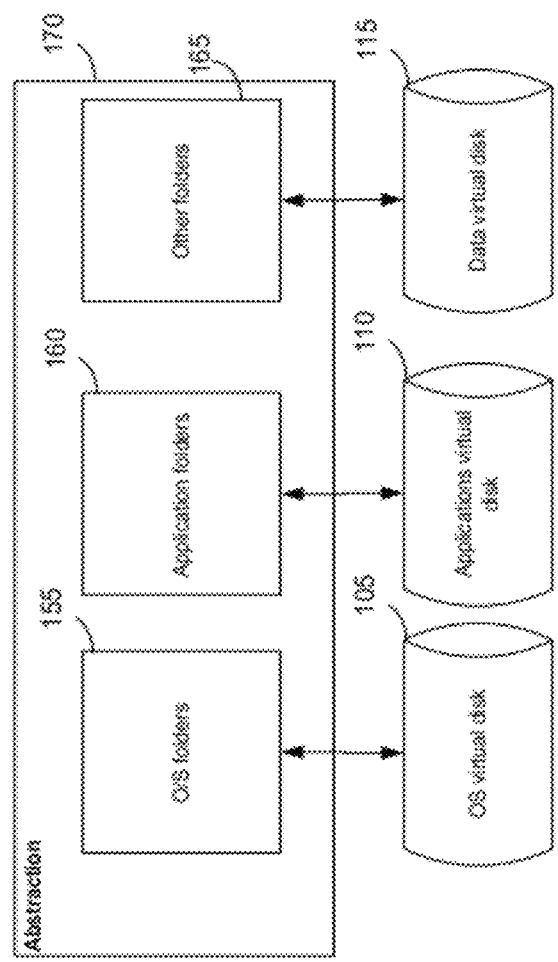
FIG. 1 is a block diagram depicting an example technique for separating information relating to each of an operating system, applications and user data into separate entities, in accordance with some embodiments of the invention.

FIG. 1 depicts an example manner of separating stored information into a plurality of entities. Specifically, in the example shown, operating system, application and user data entities are created. It should be appreciated that FIG. 1 is merely exemplary in this respect, as information may be separated into any suitable number of entities, using any suitable separation criteria. For example, stored information could alternatively be separated into two entities, with one entity storing system data (e.g., the operating system and applications) and the other entity storing user data. In another example, different entities may store data for different users. Embodiments of the invention are not limited to separating information using any particular technique or separation criteria.

In the example of FIG. 1, the three entities shown are created by partitioning top-level folders of a file system into separate virtual hard disks. Using a metaphor employed by the Microsoft Windows family of operating systems to illustrate (although it should be appreciated that embodiments of the invention are not limited to employing any particular operating system(s)), virtual hard disk 105, which stores information relating to the operating system, may store all of the folders and files kept under the C:\windows top-level folder. Virtual hard disk 110, which stores information relating to applications, may store all of the folders and files kept under the C:\Program Files folder. Virtual hard disk 115, which stores user data, may store all of the folders and files kept under any other top-level folder. Of course, separation of data into independent entities may be accomplished using any suitable criteria, which may or may not be defined in relation to aspects of a file system or any other capability provided by an operating system. Embodiments of the invention are not limited to any particular implementation.

In the example shown, abstraction 170 presents the information stored in separate virtual hard disks 105, 110 and 115 as a single entity (e.g., file system). As a result, the user may access information relating to the operating system using a familiar metaphor (e.g., via the C:\windows folder), even though the information is stored in a separate virtual hard disk (i.e., virtual hard disk 105) than that which stores information relating to applications or user data. Further, a single file system from which data stored in all virtual hard disks may be presented by abstraction 170. Of course, embodiments of the invention are not limited to employing an abstraction that represents stored data in the manner shown in FIG. 1, or indeed to employing any abstraction at all.

Figure 2:
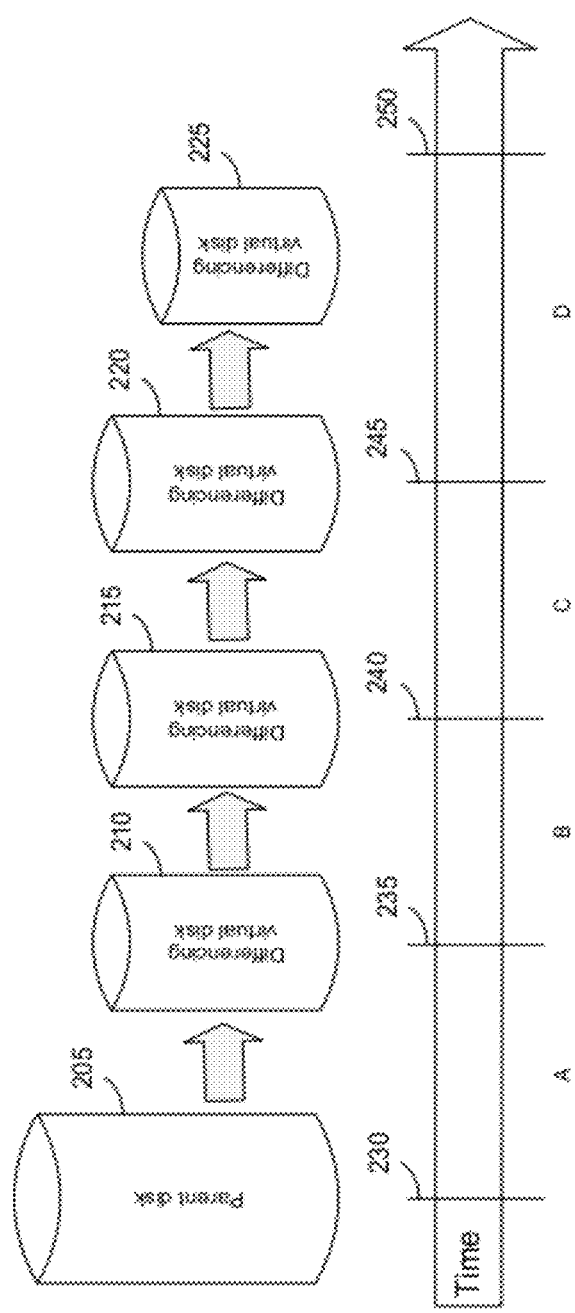
FIG. 2 is a block diagram depicting an example technique for storing changes to an example entity over time, in accordance with some embodiments of the invention.

In some embodiments, each of virtual hard disks 105, 110 and 115 employ a chain of differencing virtual disks to capture changes made to stored data over time. FIG. 2 depicts an example technique for capturing differencing virtual disks over time for an example entity. In the example shown in FIG. 2, parent disk 205 may represent any of virtual hard disks 105, 110 or 115. Parent disk 205 may, for example, be non-modifiable. A chain of differencing virtual disks 210, 215, 220 and 225 is captured over time. Specifically, in the example shown, the passage of a predetermined time period since the creation of a differencing virtual disk causes the differencing virtual disk to be closed and another one created. As a result, FIG. 2 illustrates differencing virtual disk 210 being created at point in time 230 and closed at point in time 235, so that differencing virtual disk 210 stores changes to parent disk 205 over time interval A. Differencing virtual disk 215 was then created, and captured all changes to parent disk 205 between points in time 235 and 240 (i.e., interval B) until being closed at point in time 240. Differencing virtual disk 220 was then created, and captured all changes to parent disk 205 between points in time 240 and 245 (i.e., interval C) until being closed at point in time 245. Differencing virtual disk 225 was then created, and began capturing changes to parent disk 205 at point in time 245. In the example shown, differencing virtual disk 225 is due to be closed at point in time 250, which has not yet arrived.

Figure 3:
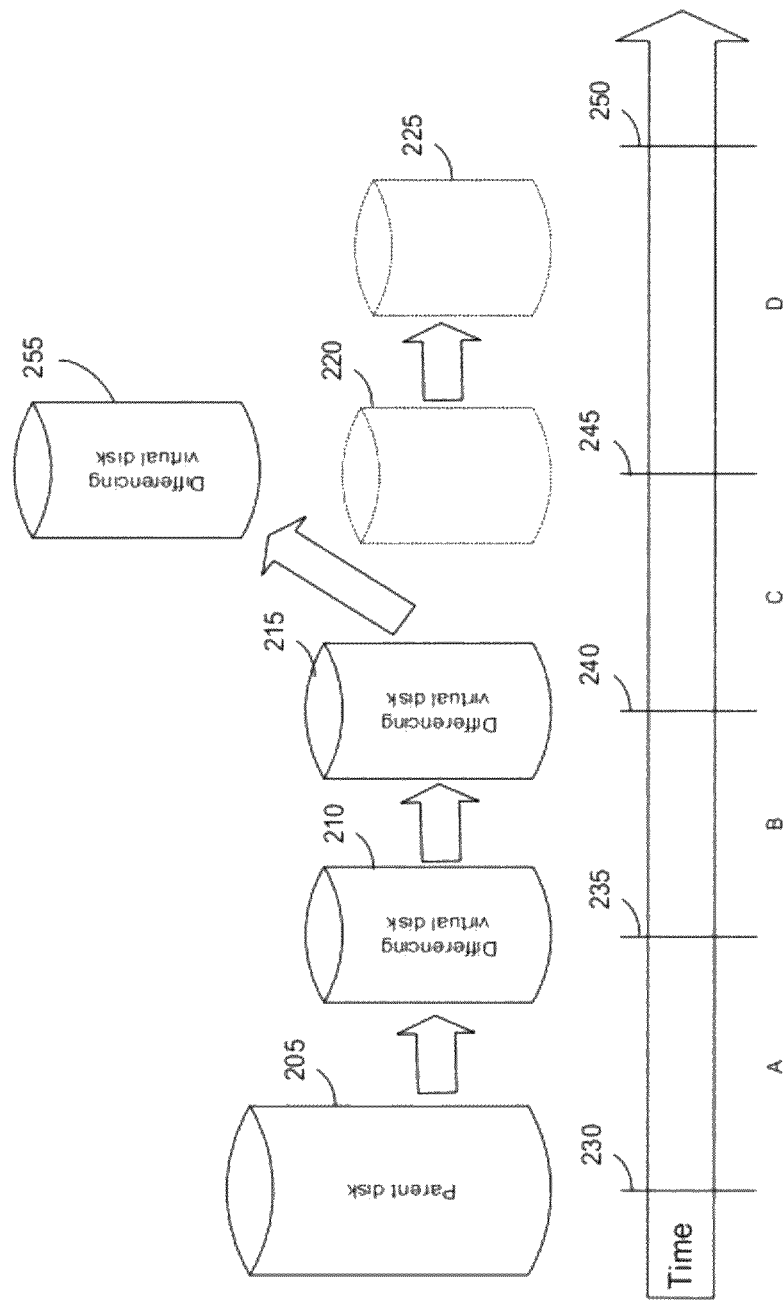
FIG. 3 is a block diagram depicting an example technique for restoring an entity to a state in which it existed at a particular point in time, in accordance with some embodiments of the invention.

FIG. 3 depicts an example technique whereby differencing virtual disks may be used to restore the system to a particular point in time. Specifically, FIG. 3 builds upon the example shown in FIG. 2 to illustrate an example manner of restoring the system to point in time 240. This may be performed for any of numerous reasons. For example, a user may begins experiencing problems with his/her computer, and suspect that (1) the problems relate to an application, and not the operating system; and (2) the problems began occurring after point in time 240. The user may then seek to restore the virtual hard disk storing information relating to applications (i.e., virtual hard disk 110 in the example shown in FIG. 1) back to the state at which the information existed at point in time 240. In the example shown, the information relating to applications is restored to point in time 240 by selecting differencing virtual disk 215, which was created at point in time 235 and closed at point in time 240. Differencing virtual disks 220 and 225 are set aside (e.g., preserved, deleted, or acted upon in any other suitable fashion), and differencing virtual disk 255 is created to replace differencing virtual disk 220 as reflecting any changes made to application information after point in time 240. For example, differencing virtual disk 255 may be created after differencing virtual disks 220 and 225 are set aside. As a result of this change, the "current state" of application information is no longer reflected by the aggregate of parent disk 205 and differencing virtual disks 210, 215, 220 and 225, as shown in FIG. 2, but rather by parent disk 205 and differencing virtual disks 210, 215 and 255.

Figure 4:
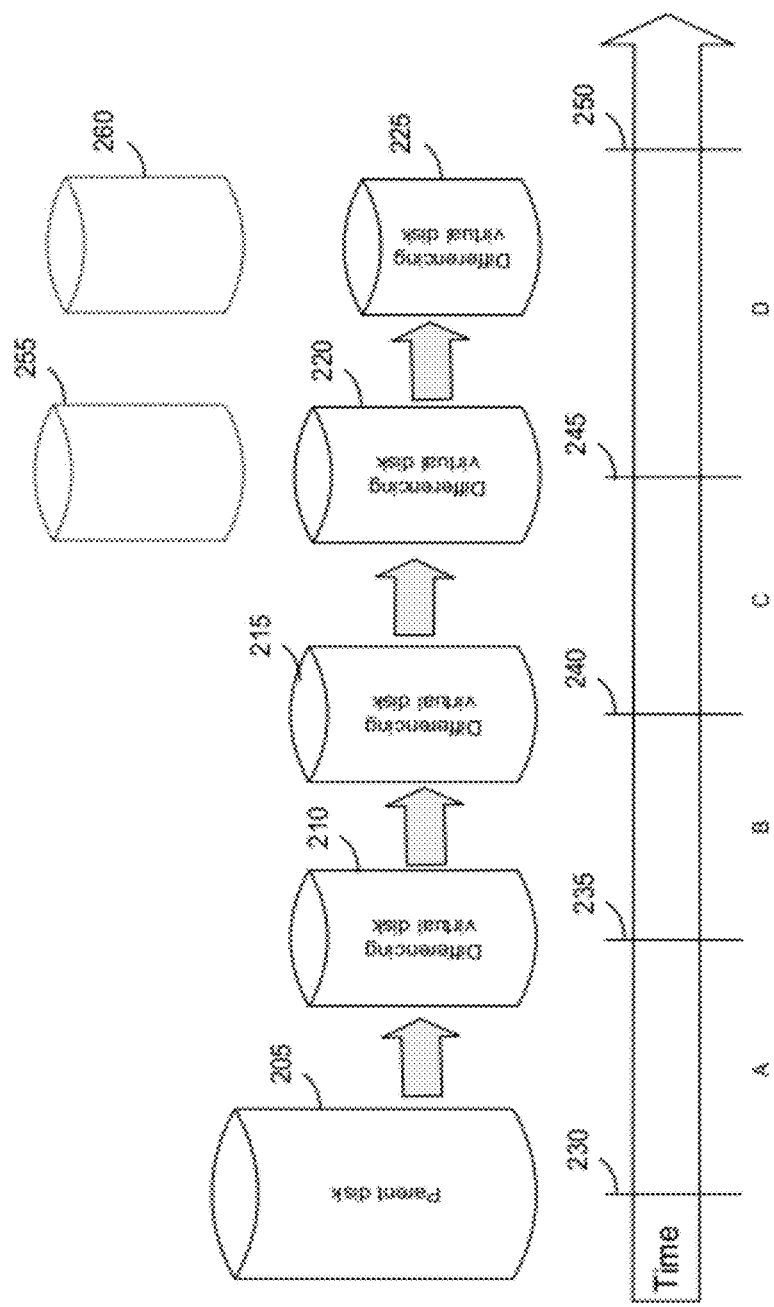
FIG. 4 is a block diagram depicting an example technique for "undoing" a restore operation, in accordance with some embodiments of the invention.

As noted above, differencing virtual disks 220 and 225 may be preserved, so as to provide the flexibility to undo the restore illustrated in FIG. 3 by reattaching the preserved differencing virtual disks to the chain. An example is shown in FIG. 4. In FIG. 4, differencing virtual disk 255, which in the example of FIG. 3 replaced differencing virtual disk 220 in the chain, stores changes made to parent disk 205 between points in time 240 and 245 (i.e., interval C), and was closed at point in time 245, whereupon differencing virtual disk 260 was created. In the example shown, differencing virtual disk 260 is due to be closed at point in time 250, which has not yet arrived.

The system restore illustrated in FIG. 3 may be undone by setting aside differencing virtual disk 255 (and by implication, differencing virtual disk 260) in favor of preserved differencing virtual disk 220. This may be performed in any of numerous ways, such as by retrieving differencing virtual disk 220 from storage. As a result of this operation, the "current" state of the system reverts to being reflected by the aggregate of parent disk 205 and differencing virtual disks 210, 215, 220 and 225, and is no longer reflected by the aggregate of parent disk 205 and differencing virtual disks 210, 215, 255 and 260, as shown in FIG. 3. It should be appreciated that in some embodiments, differencing virtual disks 255 and 260 may be preserved rather than deleted, thus providing the capability to "undo the undo" if so desired.

Figure 5:
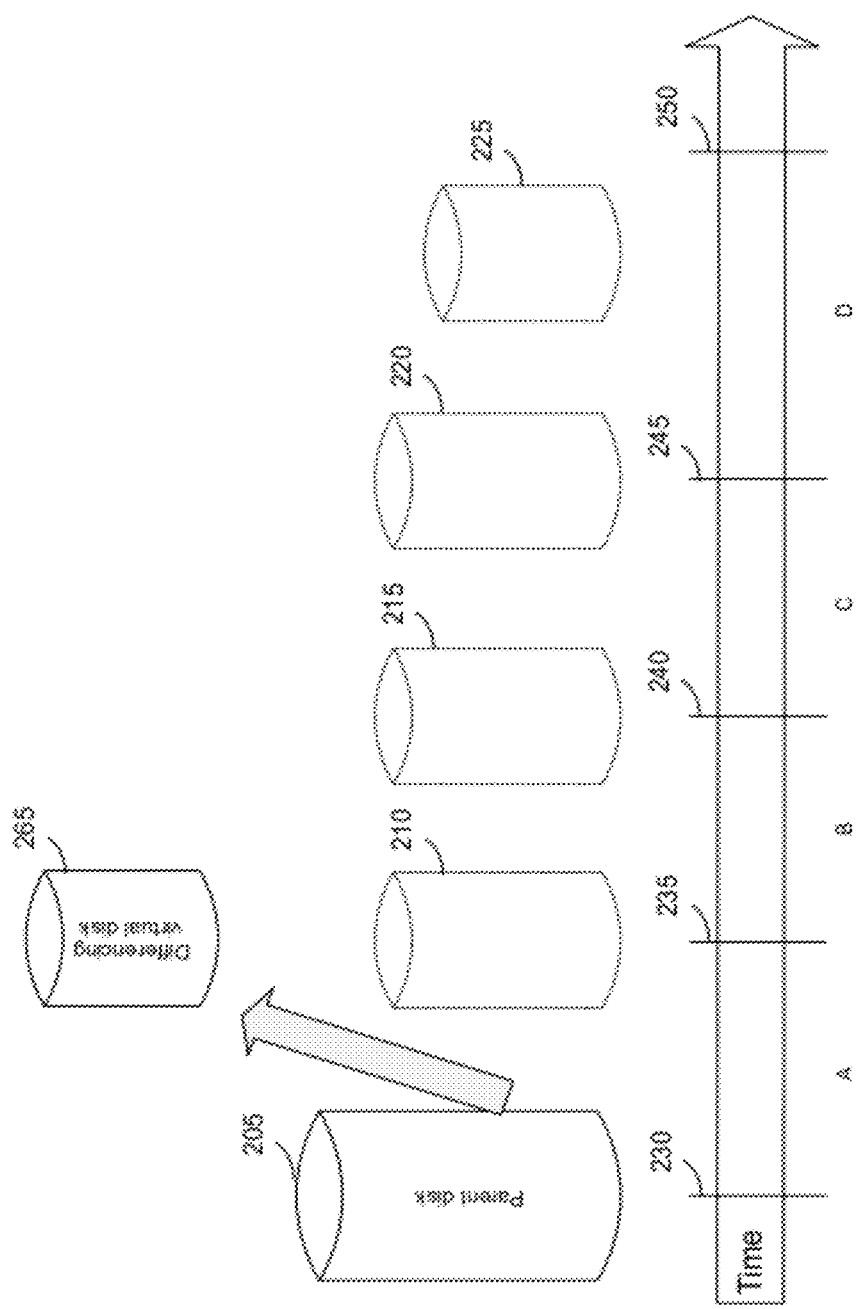
FIG. 5 is a block diagram depicting an example technique for performing a system reset, in accordance with some embodiments of the invention.

It should also be appreciated that although the preceding examples were given in the context of performing a system restore, the techniques disclosed are also applicable to performing a system reset. An example of this is shown in FIG. 5. Specifically, FIG. 5 depicts an example wherein an entity is reset to its "original" state (e.g., prior to any modifications being made after installation) by setting aside all differencing virtual disks storing changes made after the entity existed in that state.

In the example of FIG. 5, differencing virtual disks 210, 215, 220 and 225, which store all changes made to parent disk 205 since point in time 230, are set aside in favor of differencing virtual disk 265. For example, differencing virtual disk 265 may be created after differencing virtual disks 210, 215, 220 and 225 are set aside. As a result, any changes stored in differencing virtual disks 210, 215, 220, 225 are eliminated, so that the "current" state of the system is now reflected by parent disk 205 and differencing virtual disk 260.

It should be appreciated that because embodiments of the invention provide for maintaining a separate chain of differencing virtual disks for each entity, each entity may be restored or reset independently. For example, the operating system may be reset to its factory condition, applications may be restored to a state in which they existed at a first point in time, and user data may be restored to a state in which the user data existed at a second point in time. Using the example timeline shown in FIGS. 2-5 to illustrate, operating system information stored in parent disk 205 may be reset to point in time 230, application information may be restored to a state in which the information existed at point in time 235, and user data may be restored to a state in which the data existed at point in time 245. Further, any one of these restore or reset operations may be undone without affecting restore or reset operations performed on one or more other entities.

It should also be appreciated that although the examples given above relate to separate operating system, application and user data entities, embodiments of the invention are not limited to separating information in this manner. Indeed, some embodiments of the invention may not separate information at all, and instead may maintain a single entity that stores operating system, application and user data in a single parent disk and chain of differencing virtual disks. This single entity could reflect the overall state of the system, rather than just the state of an operating system, applications or user data, or some subset of these sets of information. Embodiments of the invention are not limited to any particular manner of implementation.

It should further be appreciated that not all embodiments of the invention may employ virtual hard disks and differencing virtual disks to perform the functions disclosed herein. Any suitable manner(s) of storing information in a "parent" state in which it originally existed, and a set of one or more "child" data structures reflecting changes in comparison to the parent state, may be employed, as embodiments of the invention are not limited in this respect.

Figure 6:
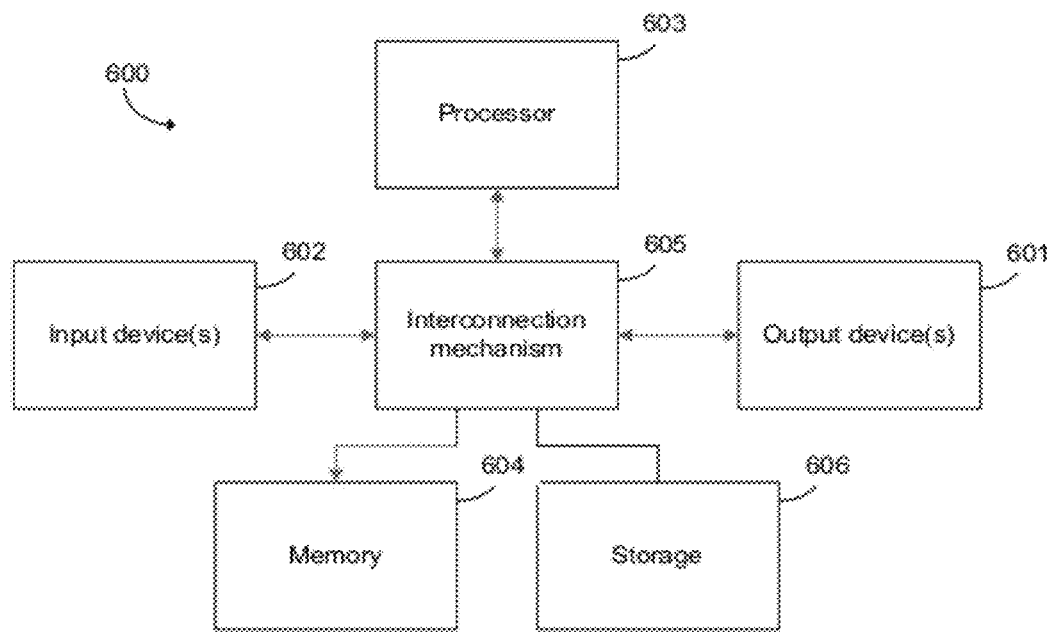
FIG. 6 is a block diagram depicting an example computer which may be employed to implement some embodiments of the invention.

Various aspects of the systems and methods for practicing features of the present invention may be implemented on one or more computer systems, such as the exemplary computer system 600 shown in FIG. 6. Computer system 600 includes input device(s) 602, output device(s) 601, processor 603, memory system 604 and storage 606, all of which are coupled, directly or indirectly, via interconnection mechanism 605, which may comprise one or more buses, switches, networks and/or any other suitable interconnection. The input device(s) 602 receive(s) input from a user or machine (e.g., a human operator), and the output device(s) 601 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 603 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Figure 7:
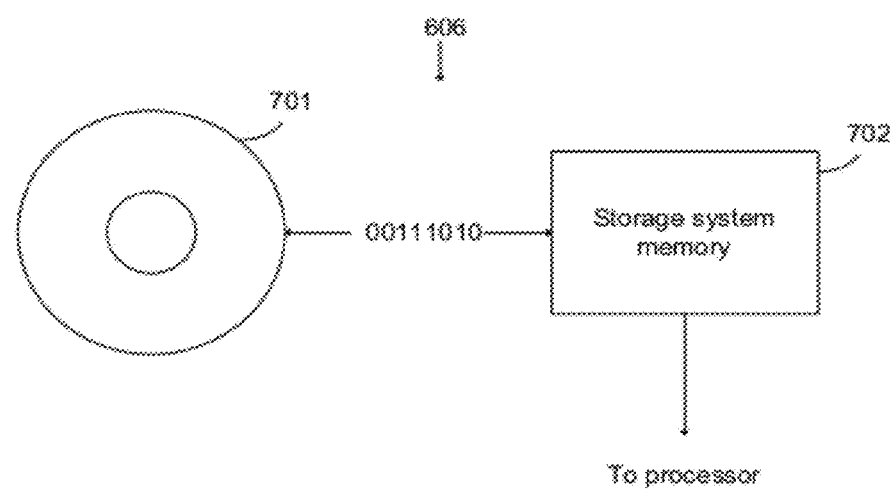
FIG. 7 is a block diagram depicting an example memory on which instructions embodying aspects of the invention may be recorded.

Processor 603 may also execute one or more computer programs to implement various functions. These computer programs may be written in any type of computer program language, including a procedural programming language, object-oriented programming language, macro language, or combination thereof. These computer programs may be stored in storage system 606. Storage system 606 may hold information on a volatile or non-volatile medium, and may be fixed or removable. Storage system 606 is shown in greater detail in FIG. 7.

Storage system 606 may include a tangible computer-readable and writable non-volatile recording medium 701, on which signals are stored that define a computer program or information to be used by the program. The recording medium may, for example, be disk memory, flash memory, and/or any other article(s) of manufacture usable to record and store information. Typically, in operation, the processor 603 causes data to be read from the nonvolatile recording medium 701 into a volatile memory 702 (e.g., a random access memory, or RAM) that allows for faster access to the information by the processor 703 than does the medium 701. The memory 702 may be located in the storage system 606 or in memory system 604, shown in FIG. 6. The processor 603 generally manipulates the data within the memory 604, 702 and then copies the data to the medium 701 after processing is completed. A variety of mechanisms are known for managing data movement between the medium 701 and the memory 604, 702, and the invention is not limited to any mechanism, whether now known or later developed. The invention is also not limited to a particular memory 604 or storage system 606.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual environment.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable storage medium having instructions encoded thereon that, when executed in a computing device that provides a capability whereby input is received to restore the computing device to a state in which the computing device existed at a previous point in time, perform a method comprising:
    providing a file system managed by an operating system of the system, the file system comprising a plurality of file system portions including a first file system portion storing information relating to the operating system, a second file system portion storing information relating to applications on the system, and a third file system portion storing information relating to user data on the computing device;
    storing the file system portions on respective separate first, second, and third virtual hard disks, each virtual hard disk reflecting an original state of the corresponding file system portion, the first virtual hard disk storing the first file system portion and not the second and third file system portions, the second virtual hard disk storing the second file system portion and not the first and not the third file system portions, the third virtual hard disk storing the third file system portion and not the first file system portion and not the second file system portion;
    for each of the file system portions, storing changes made thereto over time on a respective sets of differencing virtual disks, wherein changes to the given file system portion are stored only by the set of differencing virtual disks that correspond thereto, wherein the first file system portion does not store the second file system portion and does not store the third file system portion, wherein the second file system portion does not store the first file system portion and does not store the third file system portion, and the third file system portion does not store the first file system portion and does not store the second file system portion; and
    receiving input to restore a given one of the file system portions to a state at a first point in time by selection of a target differencing virtual disk, for the given file system portion, that stores information as of or prior to the first point in time.

2. A method performed by a computing device comprising an operating system portion, an application portion, and a user data portion, the method comprising:
    storing an initial copy of the user data portion, the operating system portion, and the application portion, wherein the user data portion and the operating system portion are separate file system portions such that the user data portion does not store the operating system portion and the file system portion does not store the user data portion;
    as the computing device is modified over time:
        capturing changes to the user data portion in a first sequence comprising a sequence of user data capture points but not to a second sequence and not to a third sequence, wherein only changes to the user data portion are stored in the first sequence;
        capturing changes to the operating system portion in the second sequence but not to the first sequence and not to the third sequence, the second sequence comprising a sequence of operating system capture points, wherein only changes to the operating system portion are stored in the second sequence; and
        capturing changes to the application portion in the third sequence but not the first sequence and not to the second sequence, the third sequence comprising a sequence of application portion capture points, wherein only changes to the application portion are stored in the third sequence; and
    allowing any given one of the portions to be individually restored to a prior point in time by rolling back corresponding capture points of the given one of the portions without rolling back the other portions.

3. The computer-readable storage medium of claim 1, wherein the differencing virtual disks are created periodically and/or upon a particular event.

4. The computer-readable storage medium of claim 1, wherein the system provides a capability whereby input is received to reset one of the file system portions to an original state, and the reset is performed by setting aside any differencing virtual disks created for the one of the file system portions.

5. The computer-readable storage medium of claim 1, wherein the method further comprises presenting an abstraction to the user which represents at least one of the file system portions.

6. The computer-readable storage medium of claim 1, wherein the method further comprises:

setting aside any differencing virtual disks that were created for the given file system portion after the first point in time;
preserving at least some of the differencing virtual disks that are set aside; and
receiving input to reattach at least a portion of the preserved differencing virtual disks to undo the restore.

7. The computer-readable storage medium of claim 1, the method further comprising receiving input to restore another of the file system portions to a state in which the other file system portion existed at a second point in time.

8. A method according to claim 2, wherein the capture points comprise differencing virtual disks.

9. A method according to claim 2, wherein the rolled back capture points are maintained on the computing device after the restore, the method further comprising undoing the restore using one of the maintained capture points.

10. A method according to claim 2, wherein the method is performed by the operating system.

11. A method according to claim 2, wherein each file system portion corresponds to a respective file system folder or directory.

12. The computer-readable storage medium of claim 4, wherein the reset is directed only to the one of the file system portions and the other file system portions are not reset to respective original states.

13. The computer-readable storage medium of claim 6, the method further comprising undoing the undo of the restore by detaching at least a portion of the differencing virtual disks reattached to undo the restore.

* * * * *